United States Patent [19]
Thomas et al.

[11] Patent Number: 5,622,542
[45] Date of Patent: Apr. 22, 1997

[54] PARTICLE-STABILIZED METAL FOAM AND ITS PRODUCTION

[75] Inventors: Martin Thomas, Kingston; Doug Kenny, Inverary; Harry Sang, Kingston, all of Canada

[73] Assignee: Alcan International Limited, Montreal, Canada

[21] Appl. No.: 492,019

[22] PCT Filed: Jan. 21, 1994

[86] PCT No.: PCT/CA94/00027

§ 371 Date: Aug. 17, 1995

§ 102(e) Date: Aug. 17, 1995

[87] PCT Pub. No.: WO94/17218

PCT Pub. Date: Aug. 4, 1994

[30] Foreign Application Priority Data

Jan. 21, 1993 [CA] Canada ................................. 2087791

[51] Int. Cl.⁶ .................................................. B22D 27/00
[52] U.S. Cl. ......................................... 75/415; 428/593
[58] Field of Search .............................. 75/415; 428/593

[56] References Cited

U.S. PATENT DOCUMENTS 5,221,324  6/1993  Jin et al. ................................. 75/415

FOREIGN PATENT DOCUMENTS

| 1215932 | 8/1989 | Japan . |
| 1215993 | 8/1989 | Japan . |
| WO9101387 | 2/1991 | WIPO . |
| WO9103578 | 3/1991 | WIPO . |
| WO9221457 | 12/1992 | WIPO . |

*Primary Examiner*—Melvyn Andrews
*Attorney, Agent, or Firm*—Cooper & Dunham LLP

[57] ABSTRACT

The invention relates to a process for producing a particle-stabilized metal foam from a composite capable of acting as a precursor composite for the metal foam. The precursor composite is formed by heating a matrix metal, e.g. aluminum or an aluminum alloy, above its liquidus temperature to form a liquid matrix metal, adding to the liquid matrix metal stabilizer particles capable of remaining dispersed within the matrix metal, e.g. MgO particles preferably in the form of agglomerates of particles and some fine particles, and mixing the liquid matrix metal and stabilizer particles under a covering gas, e.g. air, in such a way that bubbles of the gas, as well as the stabilizing particles, are dispersed throughout the matrix metal. The precursor composite can then be foamed by the introduction of a gas by a known technique to form a particle-stabilized metal foam. The entrainment of gas bubbles means that a microporosity may be introduced into some of the cell walls of the composite, which is retained when the composite is transformed into a metal foam. The foam product has improved crush and machining properties.

18 Claims, 5 Drawing Sheets

ML32781                    200x

ML29994                    200x

A - AIR MIXED - MgO
B - AIR MIXED - BLOCKY ALUMINA
C - LOW PRESSURE MIXED - BLOCKY ALUMINA

5,622,542

PARTICLE-STABILIZED METAL FOAM AND ITS PRODUCTION

TECHNICAL FIELD

This invention relates to the production of particle-stabilized metal foams. More particularly, the invention relates to a particle-stabilized metal foam having a unique cellular structure produced via a precursor which can be subsequently "foamed". The invention also relates to the metal foam precursor itself.

BACKGROUND ART

Foamed metals have high strength-to-weight ratios and are extremely useful as load-bearing materials and as thermal insulators. Metallic foams are characterized by high impact energy absorption capacity, low thermal conductivity, good electrical conductivity and high absorptive acoustic properties.

Foamed metals have been described previously, e.g. in U.S. Pat. Nos. 2,895,819, 3,300,296 and 3,297,431. In general such foams are produced by adding a gas-evolving compound to a molten metal. The gas evolves to expand and foam the molten metal. After foaming, the resulting body is cooled to solidify the foamed mass thereby forming a foamed metal solid. The gas-forming compound can be metal hydride, such as titanium hydride, zirconium hydride, lithium hydride, etc. as described in U.S. Pat. No. 2,983,597.

A recent development in the production of lightweight foamed metal is described by Jin in U.S. Pat. No. 4,973,358 issued Nov. 27, 1990. In that patent, a precursor composite of a metal matrix and finely divided solid stabilizer particles was heated above the liquidus temperature of the metal matrix and gas bubbles were discharged into the molten metal composite below the surface to thereby form a foamed melt on the surface of the molten metal composite. When this foam was cooled, it formed a solid foamed metal having a plurality of closed cells and the stabilizer particles dispersed within the metal matrix.

The metal matrix precursor composite used in the process of U.S. Pat. No. 4,973,358 was one in which the contained stabilized particles were quite uniform in size and were fully wetted by the matrix material. One such product that was used was the aluminum matrix composite sold under the trademark DURALCAN by Alcan Aluminum Corporation. However, such composites are expensive to produce and result in a relatively expensive foam product.

Metal foam generated from such precursor materials have as stabilizing particles monolithic or blocky particles, typically SiC or alumina. These precursor composites are also produced under reduced pressures or even under vacuum conditions. Foam generated from such material has been found to be difficult to cut except for the lowest density material.

An object of this invention is to provide metal foams having desirable properties using a relatively inexpensive procedure.

A further object of this invention is to provide an alternative to standard metal matrix precursor composites used for producing metal foams.

Another further object is to provide a relatively inexpensive precursor for the production of foamed metals.

A further object is to provide a stabilized metal foam which is easier to machine than previous stabilized foam materials.

A still further object is to provide a stabilized metal foam with modified and adjustable crush properties.

DISCLOSURE OF THE INVENTION

According to the present invention, there is provided a process for producing a metal foam, which comprises: heating a matrix metal above a liquidus temperature of the metal to form a liquid matrix metal, adding to said liquid matrix metal stabilizer particles capable of remaining dispersed within the matrix metal, mixing the liquid matrix metal and stabilizer particles under a covering gas in such a way that bubbles of said gas, as well as said particles, are dispersed throughout the matrix metal to form a composite which is a precursor for a particle-stabilized metal foam (referred to hereinafter as a "precursor composite"), introducing a gas into said precursor composite in molten form to form a liquid metal foam, and solidifying said liquid metal foam with closed cells substantially filled with gas to form a solid particle-stabilized metal foam.

The invention also relates to the resulting metal foams and to a process for producing a precursor composite suitable for foaming and the precursor composite thus produced.

According to an aspect of the present invention, there is provided a process for producing a metal foam, which comprises: heating a matrix metal above a liquidus temperature of the metal to form a liquid matrix metal, adding to said liquid matrix stabilizer particles, mixing the liquid matrix metal and stabilizer particles under a covering gas in such a way that said particles are dispersed throughout the matrix metal to form a precursor composite for a particle stabilized metal foam, wherein said precursor composite may incorporate some of the said gas in pores within the precursor composite, introducing a gas into said precursor composite in molten form to form a liquid metal foam with closed cells substantially filled with gas, and solidifying said liquid metal foam to form a solid particle-stabilized metal foam.

The foam as produced by the above method may contain pores within some of the walls of the foam. The number of these pores may be controlled by altering the method of mixing of the precursor composite, for example, more vigorous mixing will result in more pores.

According to another aspect of the present invention, there is provided a process for producing a metal foam, which comprises: heating a matrix metal above a liquidus temperature of the metal to form a liquid matrix metal, adding to said liquid matrix stabilizer particles consisting of a mixture of particles mixing the liquid matrix metal and stabilizer particles under a covering gas in such a way that said particles are dispersed throughout the matrix metal to form a precursor composite for a particle stabilized metal foam, introducing a gas into said precursor composite in molten form to form a liquid metal foam, and solidifying said liquid metal foam to form a solid particle-stabilized metal foam, where the walls of the foam contain a distribution of stabilizer particles with the finer particles preferentially located at the interfaces between the cell walls and the gas filled cells.

The walls of the foam produced by this embodiment may contain pores. The number of such pores may be varied, as in the previous embodiment, by varying the mixing conditions in the precursor composite production. The gas pressure during the production of precursor composite by this embodiment may also be varied, for example, by operating the process in a closed vessel under reduced pressure. Gas pressures of less than 10 Torr may be used while still generating pores within the precursor and final foam product, and still ensuring that fine particles are still preferentially located adjacent to the surfaces of the closed cell walls. Nevertheless it is most convenient in this embodiment to operate at atmospheric pressure.

The mixtures of stabilizer particles preferentially have a specific surface area as measured by BET nitrogen adsorption of at least 2.0 $m^2$/gm and more preferably at least 10 $m^2$/gm. Mixtures of particles with specific surface areas in this range may consist of a broad range of particles sizes, including a substantial number of fine particles, and therefore differ from the narrow distribution of blocky or monolithic particles of the prior art. It is preferred that the mixtures of stabilizer particles contain aggregates or agglomerates of finer particles, and it is most preferred that such mixtures consist almost entirely of such agglomerates. The aggregates preferably are sufficiently weak that the stirring action of the mixer used in the precursor composite preparation is sufficient to break up a substantial number of these agglomerates to produce fine particles within the final foam product. These fine particles may have a wide size distribution but often contain appreciable quantities of material having particle sizes of less than 1 μm. The amount of shear which has to be introduced to break up these agglomerates is typically similar to that used to ultrasonically disperse materials for particle size distribution by sedigraph, etc. The breakup may be assisted by the wetting or partial wetting of the particles by the matrix alloy.

Suitable stabilizer particles may be alumina with high surface area (calcined or activated), MgO, feldspar, calcined bauxite and many others. A particularly useful stabilizer particle is MgO in a form which has a substantial specific surface area, for example at least 25 $m^2$/gm. By comparison, a blocky alumina as used in the prior art method of producing foam would have a specific surface are of about 0.5 $m^2$/gm.

Because of the high surface area of the stabilizer particles most suitable for the present invention, the particles frequently require calcination prior to mixing in the precursor composite to drive adsorbed water and other gases.

The foam generated from precursor composite produced under a gas has specific crush strength properties that can be adjusted by varying the mixing method and the gas pressure. With the addition of stabilizer particles that are mixtures containing agglomerates, the full advantages of the new material, including improved machinability can be developed.

Because the process can be varied by changing the mixing in the precursor composite production step and by altering the gas pressure in the same step, it must be appreciated that the number distribution of the pores can be varied within the structure. It is possible to reduce the number of pores to the extent that about 10% of cell walls contain pores or to increase the number to the extent that over 50% of cell walls contain significant number of pores.

The foamed product obtained by the process using stabilizer particles which contain a distribution of particles sizes including agglomerates also is characterized by the presence of a distribution of particles throughout the cell walls with fine particles preferentially located at the interfaces between the cell walls and the gas filled cells within the foam structure. This differs from the prior art foam wherein the stabilizer particles were generally mono-sized and located essentially at the interfaces only.

While not wishing to be bound by any theory, it is believed that refractory particles may be used which are capable of undergoing an interaction with the matrix metal, thus forming a compound at the particle/matrix interface. It is further believed that this interaction may predominate over contact angle in keeping the particles dispersed in the molten matrix. While a variety of refractory particles may meet these requirements, a particularly effective material is MgO.

A particularly effective combination is an aluminum matrix with stabilizing particles of MgO mixed in an open vessel so that air forms the gas component of the composite. The aluminum and MgO interact to form spinel ($MgAl_2O_4$) at the interface. This spinel forms a coating on the MgO particles and thereby keeps the particles dispersed in the matrix.

The matrix metal may consist of a wide variety of metals capable of being mixed in the molten state by vortex mixing. Examples of these include aluminum, magnesium, steel, zinc, lead, nickel, copper and alloys thereof. Of particular interest are standard wrought, cast or other aluminum alloys, for example alloys available under Aluminum Association (AA) designations 6163, 2024, 7075, 7079 and A356. A particularly useful matrix alloy has been found to contain at least 5% Si and up to 3% Mg. For example, the foundry alloy A356 with 3% Mg added is particularly useful with MgO. The matrix alloy may enhance the machinability properties of the foam.

For mixing the stabilizer particles with the metal matrix it is preferable to use an impeller in such a manner that a vortex is formed in the molten metal. The stabilizer particles are added to the molten metal with mixing and preferably the impeller is first rotated at a lower speed in order to subduct the refractory particles beneath the liquid metal surface using the vortex. Once this is accomplished, the impeller is rotated at a higher speed in order to create high shear conditions which intimately disperse the stabilizer particles throughout the liquid metal matrix. In one preferred embodiment, the impeller is first slowly rotated (e.g. at 500–900 rpm) and then rotated more quickly (e.g. at 800–1200 rpm). The gas component of the precursor composite is entrained in the melt at both low and high impeller speeds.

The gas component of the precursor composite enters the open vessel and is entrained into the molten metal vortex caused by the rotation of the impeller. The shear forces on the metal break the entrained gas into small bubbles which are stabilized by the ceramic particles within the metal matrix composite. The gas for this component can be selected from a group consisting of air, $CO_2$, $O_2$, $N_2$, inert gases, etc. Because of its convenience, air is usually preferred.

There are several important advantages in this invention over the prior art. Firstly, because the stabilizing particles can be in the form of a bulk chemical of random sizes and some non-wetting properties (presence of adhering gas bubbles) can be accepted, and because the entire mixing process may take place in an open vessel (no vacuum being required), the precursor composite is cheap and easy to make. Secondly, the foamed product obtained from the precursor composite is more machinable and is easier to cut than traditional particle stabilized foam metals. In summary, the use of foam precursor composite of the present invention to produce metal foam materials results in a unique cellular structure, lowers the production costs of the material and eases both the machinability and cutability of the foamed products. A desirable strength of the foam product may be achieved by varying the porosity within the cell walls.

BRIEF DESCRIPTION OF THE DRAWINGS

Methods and apparatus for performing the present invention will now be more particularly described by way of example with reference to the accompanying drawings in which.

BEST MODES FOR CARRYING OUT THE INVENTION

Figure 1:
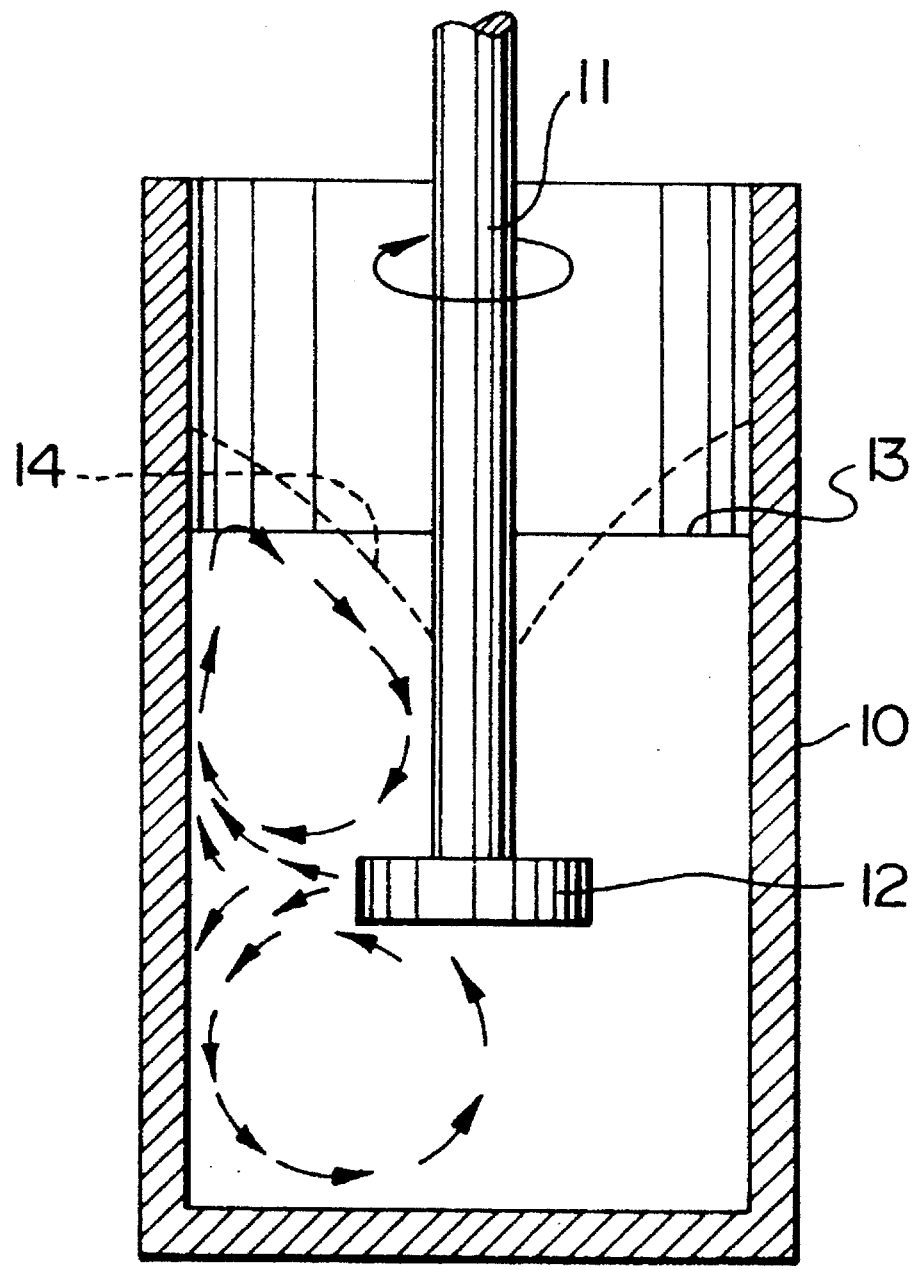
FIG. 1 illustrates schematically an apparatus for carrying out vortex mixing, suitable for production of precursor composites of this invention.

In the apparatus shown in FIG. 1, a crucible 10 contains a rotatable shaft 11 provided with an impeller 12 including two shear bars. In operation, molten metal is filled to the level 13 and the impeller is rotated at a speed of about 500–900 rpm to form a vortex 14. The stabilizer particles according to the invention are added to the molten metal with mixing at an impeller speed of 500–900 rpm and the resulting vortex subducts the stabilizer particles beneath the surface of the molten metal. This slower speed mixing is continued until all of the stabilizer particles are beneath the metal surface. Then the rotational speed of the impeller is then increased to the range of 800–1200 rpm to create high shear conditions whereby the stabilizer particles are intimately dispersed within the liquid metal and the entrained gas is sheared and stabilized to form fine gas bubbles.

The material thus formed comprises a foam precursor composite which can be foamed to produce lightweight foamed metal products. This foam precursor composite contains the ceramic particles of widely varying sizes unevenly dispersed throughout the metal matrix. Some of these ceramic particles have adhering gas bubbles, and there are also a number of stabilized fine gas bubbles or pores throughout the matrix. Since the initial ceramic particles are unsized, there is also a tendency for clumps and aggregates of particles to exist within the precursor composite. These do not seem to affect the subsequent foaming procedure.

It is believed that the combination of aggregates along with finer particles present in the original particles or generated during mixing of the precursor composite provide the unique structure and properties of the material produced by this process. The fine particles present assist in stabilizing the foam by migrating to the surfaces of the cell walls. The proportion of agglomerates or clumps in the particles added to the precursor composite, the type of mixing used in forming the precursor composite, and the pressure of gas used in the precursor composite mixing vessel will all therefore affect the fine porosity in the final foam product and hence the properties.

The following non-limiting examples illustrate certain preferred embodiments of the invention.

EXAMPLE 1

Using the crucible of FIG. 1, A356 aluminum alloy in the form of auto scrap was melted and 3% by weight of free magnesium was added thereto. Then with the impeller rotating at a speed in the range of 500–900 rpm, 11.6% by volume of bulk MgO was added to the molten metal. The MgO had particles of average size 17 μm as measured by Sedigraph without vigorous dispersion but which generated a broad distribution of sizes in the range from less than 1 μm to 60 μm following ultrasonic agitation for 10 minutes in the presence of a dispersant. During the mixing, the molten alloy was maintained at a temperature of 725° C. and the MgO was preheated to that temperature before being added to the melt.

The mixing at 500–900 rpm was continued for about 10 minutes, after which the speed was increased to the range 800–1200 rpm and continued for a further 20 minutes. The product obtained was a precursor composite for producing a foamed metal product.

Figure 2:
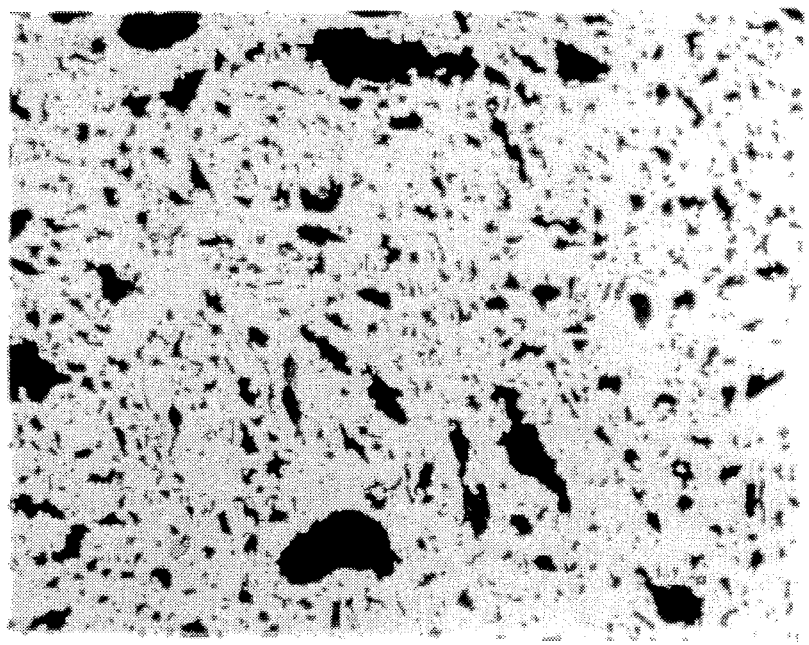
FIG. 2 is a photomicrograph of a cross-section through a precursor composite of the invention at 50× magnification. The precursor composite was produced using MgO and air at atmospheric pressure.
Figure 3:
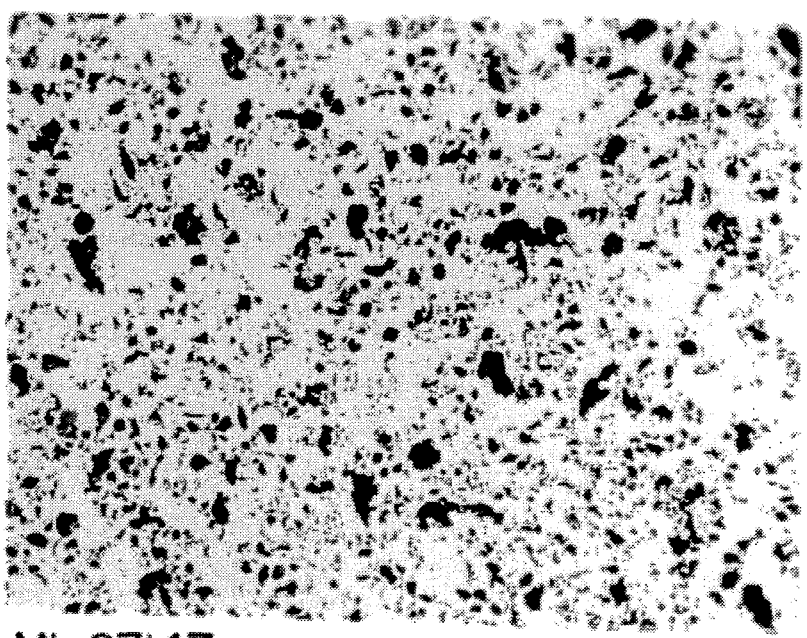
FIG. 3 is a photomicrograph of a cross-section through a precursor composite of the invention at 50× magnification. The precursor composite was produced using MgO and a low pressure of gas.

The precursor composite formed was allowed to solidify and the solidified cast was sectioned and examined microscopically. The results obtained are shown in FIG. 2 and it will be seen that there is substantial porosity and that there is a wide range of MgO particle sizes. FIG. 3 shows a cross-section of a precursor composite prepared from the same bulk MgO as the present example, but where the precursor mixing was done under a reduced pressure (approximately 0.5 Torr). The number of gas bubbles present in the precursor composite is substantially less than the precursor composite produced under one atmosphere, but the wide range of particle sizes of MgO are present.

Figure 4:
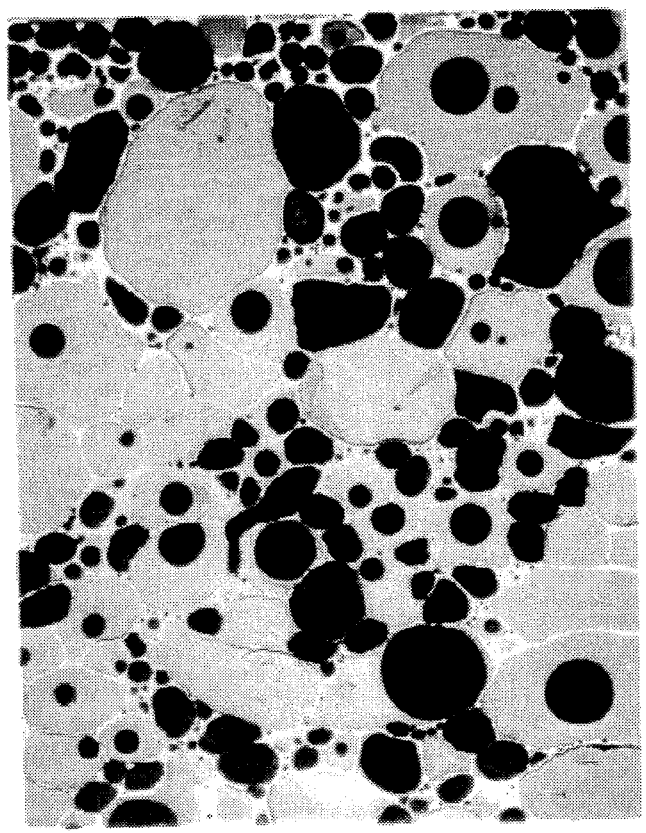
FIG. 4 shows a 4× magnification of a cross-section through a metallic foam structure produced using the foam precursor composite illustrated in FIG. 2.
Figure 5:
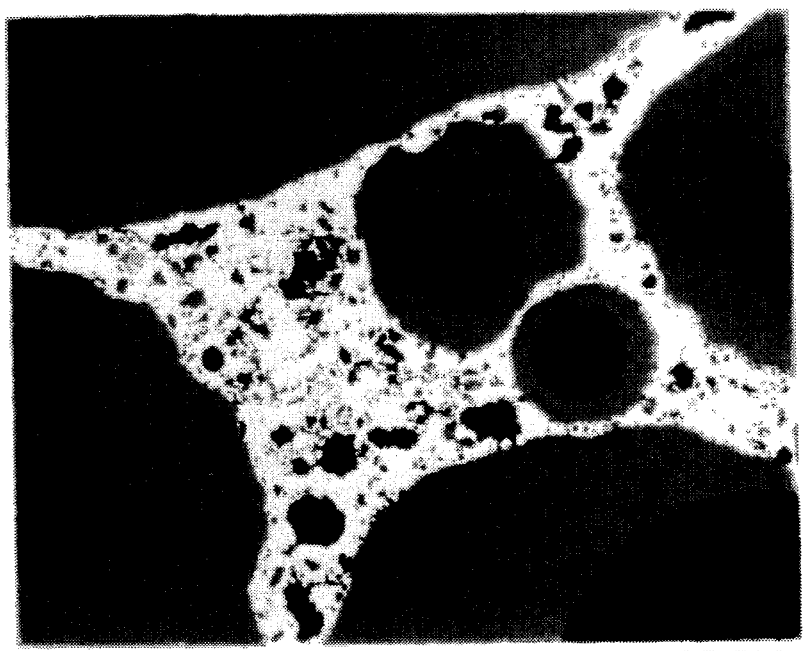
FIG. 5 shows a 100× magnification a further cross-section through a metallic foam structure of the invention, using the foam precursor composite illustrated in FIG. 2.

A metal foam was produced by a known technique from the precursor composite prepared as above, and cross-sections are shogun in FIGS. 4 and 5. The microporosity in the large cell walls is particularly apparent from FIG. 5.

Figure 6A:
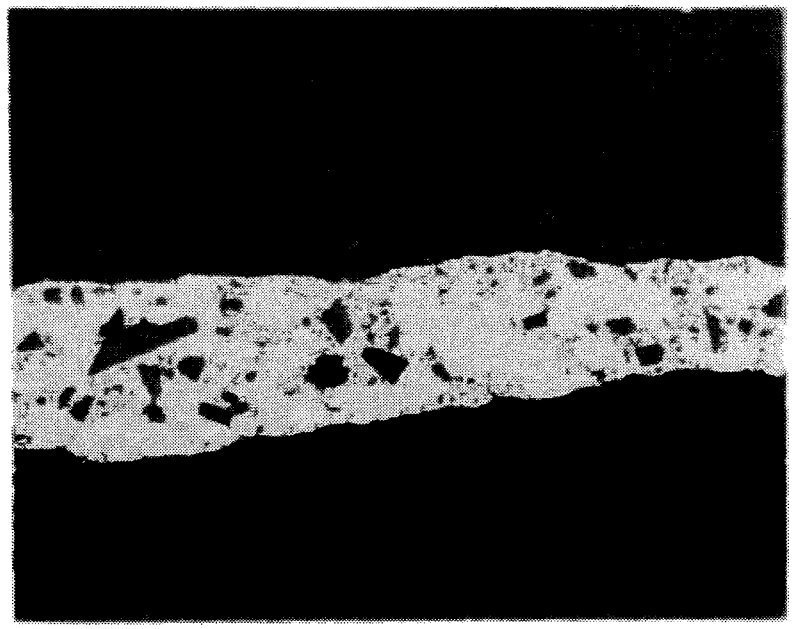
FIG. 6A is a 200× magnification of a cell wall from the foam product of the invention produced using the foam precursor composite illustrated in FIG. 2 showing the stabilizer particle distribution characteristic of the invention.
Figure 6B:
FIG. 6B is a 200× magnification of a cell wall from a foam product produced using a foam precursor composite formed by incorporating blocky alumina into the matrix metal under reduced pressure conditions, and represents the prior art foam.

FIG. 6A is a micrograph at 200× of a cell wall where few pores are visible. The stabilizer particles are visible distributed throughout the wall, but with the fine particles preferably located at the interfaces. FIG. 6B is a micrograph of a foam wall where stabilizer particles are blocky alumina mixed into the precursor composite under reduced pressure. The particles in the structure are almost entirely located at the interfaces.

EXAMPLE 2

The material produced by the method of Example 1 (and referred to as Material A) was subject to compressive strength tests. Foam (Material B) was also prepared from the same starting materials as Material A but the precursor was mixed to generate fewer gas bubbles in the precursor composite. Material A had pores present in approximately 50% of the cell walls whereas Material B has pores present in approximately 10 to 20% of the walls. Finally foam (Materials C and D) were prepared respectively using 10% blocky alumina (0.5 m²/g specific surface area) with AA6061 matrix alloy, and 10% SiC of approximately the same specific surface area with A356 matrix alloy, both however mixed under a reduced gas pressure (approximately 3 Torr). Materials C and D were therefore typical of prior art foam material. The compressive strength at 20% reduction was compared at a foam density of 0.23 g/cm². The compressive strength of Material A was found to be 0.37±0.22 MPa, the compressive strength of Material B was found to be 0.75 MPa and the compressive strength of Materials C and D were found to both be 0.93 MPa. This indicates the adjustment of compressive strength possible in the present invention by combination of precursor composite mixing method and use of particles of high surface area or consisting of agglomerates.

EXAMPLE 3

Figure 7:
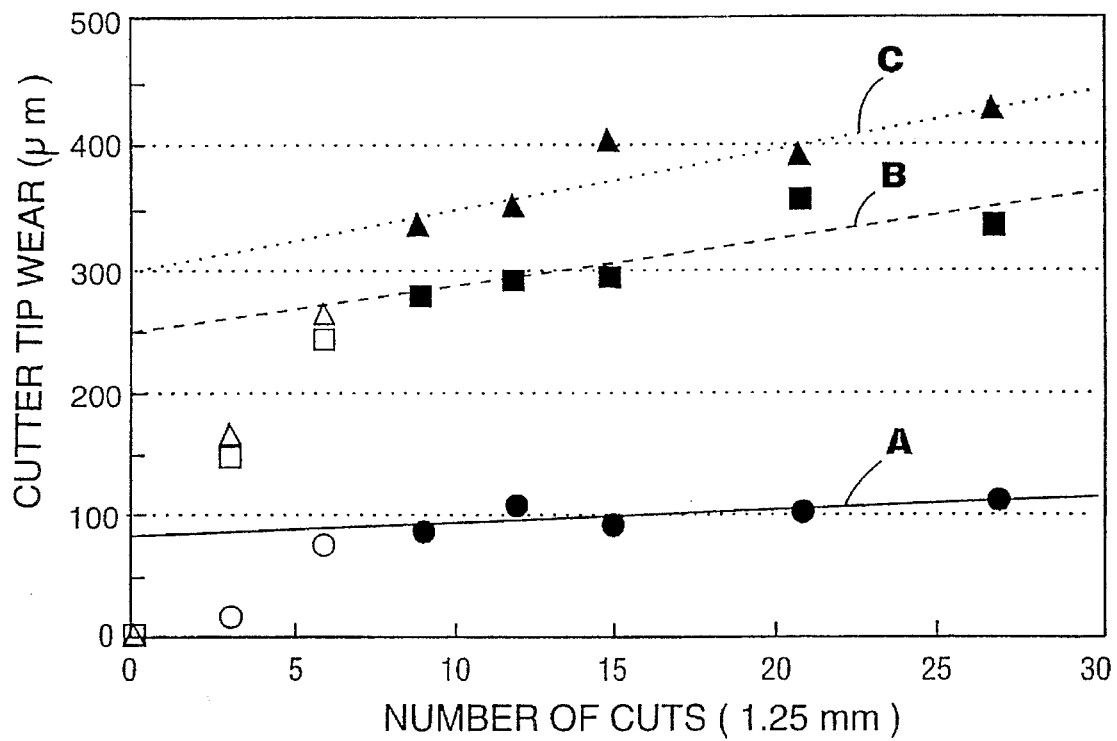
FIG. 7 is a plot of cutter tip wear versus number of cuts for foams of the invention compared to prior art foam.

Material B of the previous example (MgO stabilizer particles, air mixed and foamed to give product with 10–20% pores in the foam walls) was tested for machinability and compared to Material C of the previous example (blocky alumina stabilizer particles, precursor produced under reduced gas pressure) and a foam product (Material E) prepared as for Material C except that precursor mixing was carried out under one atmosphere of air in order to introduce a degree of porosity into the foam walls similar to Material B. Machinability was tested by passing slabs of foam material through a single blade milling machine and measuring the amount of blade wear versus the number of cuts completed by the machine. Results of these tests are shown plotted in FIG. 7. The slopes of the wear curves after initial machining passes (open symbols) were completed represent the characteristic wear behaviour of the sample (solid symbols on FIG. 7). For these tests, the prior art foam (triangles, Material C) had a slope of 4.5 μm/cut, the foam produced from the same blocky alumina mixed under an atmosphere of air (squares, material E) had a slope of 3.7 μm/cut, and the foam produced by the method of Example 1 with limited porosity in the walls (circles, Material B) had a slope of 0.95 μm/cut. The lowest slope represents the easiest machinability, and demonstrates that there was a benefit of using agglomerates in the present invention in terms of machinability.

We claim:

1. A stabilized metal foam product, comprising a metal matrix having dispersed therethrough a plurality of closed cells substantially filled with gas, said cells being separated by cell walls formed of said metal matrix composite, characterized in that a mixture of solid stabilizer particles containing a distribution of particle sizes and obtained from mixtures of stabilizer particles added to the metal matrix having a specific surface area as measured by BET nitrogen adsorption of at least 2.0 m²/g is distributed throughout the cell walls with finer particles of the mixture preferentially located at the interfaces between the closed cells and the cell walls.

2. A metal foam product according to claim 1, characterized in that pores are further provided within at least some of the cell walls.

3. A metal foam product according to claim 2, characterized in that at least 10% of the cell walls contain pores.

4. A metal foam product according to any one of claims 1–3, characterized in that the metal matrix is aluminum or an alloy thereof.

5. A metal foam product according to claim 4, characterized in that the aluminum alloy contains at least 5% Si and up to 3% Mg.

6. A metal foam product according to claim 1 characterized in that the stabilizer particles are formed of a high surface area material.

7. A metal foam product according to claim 1, characterized in that the stabilizer particles are formed of MgO, activated alumina, calcined alumina, feldspar, or calcined bauxite.

8. A metal foam product according to claim 7, characterized in that the stabilizer particles are a mixture of agglomerates of particles and fine particles formed by breakup of the agglomerates.

9. A metal foam product according to claim 8, characterized in that the stabilizer particles are formed by MgO.

10. A metal foam product according to claim 9, characterized in that the fine particles concentrated at the interfaces between the closed cells and the cell walls are formed from breakup of agglomerates.

11. A process for producing a foamed metal product wherein gaseous bubbles are retained within a mass of molten metal during the foaming, comprising the steps of heating a matrix metal above a liquidus temperature of the metal to form a liquid metal matrix, adding to said liquid matrix metal stabilizer particles wherein said stabilizer particles consist of a mixture of particles with a specific surface area as measured by nitrogen BET methods of at least 2.0 m²/g, mixing the liquid matrix metal and stabilizer particles under a covering gas until the stabilizer particles are dispersed within the liquid matrix metal and small gas bubbles are entrained and stabilized by the particles to thereby form a precursor composite for a particle-stabilized foam, then introducing a gas into said precursor composite in molten form to form a particle-stabilized metal foam, and removing said foam.

12. A process according to claim 11, characterized in that the pressure of said covering gas is controlled such that the gas bubbles are dispersed into said precursor composite, and said foam contains pores within the walls of the foam, and the number of said pores is governed by the pressure of said covering gas.

13. A process according to claim 12, characterized in that the pressure of said covering gas is less than 10 Torr.

14. A process according to claim 11, characterized in that the mixture of particles has a distribution of particle sizes with finer particles preferentially located at the interfaces between the closed cells and the cell walls.

15. A process according to claim 14, characterized in that said mixture of particles contains a substantial number of particles which are agglomerates of particles.

16. A process according to claim 11, characterized in that said mixture of stabilizer particles has a specific surface area of at least 10 m²/g.

17. A process according to claim 11, characterized in that the walls of the foam contain pores and the number of said pores is controlled by the mixing intensity during the mixing of the precursor composite.

18. A process according to claim 11, characterized in that said precursor composite is solidified and remelted prior to introduction foam-forming gas.

* * * * *